United States Patent [19]

Hill

[11] Patent Number: 4,705,150

[45] Date of Patent: Nov. 10, 1987

[54] METHOD AND MACHINE FOR SPLINING CLUTCH HUBS WITH CLOSE TOLERANCE SPLINE BELLMOUTH AND OIL SEAL SURFACE ROUNDNESS

[76] Inventor: Gary R. Hill, 25809 Mary St., Mt. Clemens, Mich. 48085

[21] Appl. No.: 749,965

[22] Filed: Jul. 1, 1985

Related U.S. Application Data

[62] Division of Ser. No. 500,754, Jun. 3, 1983.

[51] Int. Cl.⁴ .............................................. F16D 13/60
[52] U.S. Cl. ................................. 192/70.2; 192/87.11
[58] Field of Search .............. 192/70.2, 70.19, 85 AA, 192/87.1, 87.11, 87.14, 87.15

[56] References Cited

U.S. PATENT DOCUMENTS

| | | | |
|---|---|---|---|
| 76,220 | 3/1868 | Mason | 72/85 |
| 1,510,889 | 10/1924 | Hooker | 72/85 |
| 2,002,367 | 5/1935 | Fahrney | 192/85 AA |
| 3,042,169 | 7/1962 | Schwartz | 192/87.15 X |
| 3,062,077 | 11/1962 | McCardell | 72/88 |
| 3,214,951 | 11/1965 | McCardell | 72/88 |
| 3,407,638 | 10/1968 | Greis et al. | 72/96 |
| 3,473,211 | 10/1969 | Lindell | 29/159.2 |
| 3,478,852 | 11/1969 | Fuehrer et al. | 192/87.15 X |
| 3,630,058 | 12/1971 | Kiplinger et al. | 72/96 |
| 3,744,605 | 7/1973 | Piret | 192/85 AA X |
| 3,982,415 | 9/1976 | Killop | 72/88 |
| 4,028,922 | 6/1977 | Killop | 72/88 |
| 4,045,988 | 9/1977 | Anderson | 72/108 |
| 4,155,237 | 5/1979 | Jungesjo | 72/88 |
| 4,225,026 | 9/1980 | Yamamori et al. | 192/70.2 |
| 4,267,910 | 5/1981 | Yamamori et al. | 192/70.2 X |

FOREIGN PATENT DOCUMENTS 643678 4/1937 Fed. Rep. of Germany ........ 192/85 AA

*Primary Examiner*—Rodney H. Bonck
*Assistant Examiner*—Richard M. Lorence
*Attorney, Agent, or Firm*—Edward J. Timmer

[57] ABSTRACT

In pressure forming splines or teeth in the sleeve of a clutch hub and the like, a rotatable toothed mandrel and a pair of sliding toothed racks are offset relative to one another such that when the sleeve of the clutch hub blank is placed on the mandrel, a ring-shaped lip portion of the sleeve adjacent the open sleeve end is not intermeshed between the mandrel teeth and rack teeth and thus is not splined and such that a transition region between the cylindrical oil seal surface and the sleeve is splined. The clutch hub thus includes splines on the sleeve terminating short of the open sleeve end in an unsplined ring-shaped lip portion and extending at the other end contiguous with splines formed in the transition region between the oil seal surface and sleeve. A clutch hub can thereby be manufactured having, in combination, a longitudinal tooth taper (bellmouth) within required close tolerances, e.g., within 0.010 inch, preferably within 0.005 inch, and an oil seal surface with roundness within required close tolerances, e.g., within 0.005 inch.

13 Claims, 7 Drawing Figures

METHOD AND MACHINE FOR SPLINING CLUTCH HUBS WITH CLOSE TOLERANCE SPLINE BELLMOUTH AND OIL SEAL SURFACE ROUNDNESS

This application is a division of application Ser. No. 500,754, filed 6-3-83.

FIELD OF THE INVENTION

The present invention relates to machines and methods for pressure forming splines or tooth elements on a cup-shaped power transmission member by intermeshing mandrel teeth and rack teeth and also relates to the toothed or splined member that is formed thereby.

BACKGROUND OF THE INVENTION

The manufacture of power transmission members, to which this invention relates, has utilized a pair of slidable toothed racks and a rotatable toothed mandrel to develop the tooth form in the periphery of an annular or tubular workpiece. A machine has been provided for rotatably supporting the mandrel between the pair of toothed racks which are mounted for sliding motion past opposite sides of the mandrel on slide members.

The McCardell U.S. Pat. No. 3,214,751 issued Nov. 2, 1965 of common assignee herewith discloses a machine of this type having a rotatable cylindrical mandrel and a pair of tooth forming racks disposed on opposite diametrical sides of the mandrel and slidable in opposite directions against a tubular workpiece on the mandrel. A smooth (not toothed) mandrel is employed since tooth elements are to be formed on the outside of the tubular workpiece.

The Killop U.S. Pat. No. 3,982,415 issued Sept. 28, 1978 describes an apparatus for splining a cup-shaped power transmission member wherein a pair of slidable tooth forming racks are employed in conjunction with a hollow, toothed mandrel supported rotatably at opposite open ends by first and second arbors with the annular end wall of the cup-shaped member engaged against the end of the mandrel. The Killop U.S. Pat. No. 4,028,922 issued June 14, 1977 discloses a somewhat similar apparatus adapted for splining a cup-shaped power transmission member wherein the hollow mandrel is affixed to the machine headstock spindle and the open sleeve of a cup-shaped workpart is slid onto the free mandrel end. The sleeve of the workpart is splined along its length to the open end where axial depressions may be formed by the racks. The rack teeth forming the depressions are said to support the open end during splining to reduce out of roundness thereof.

The Jungesjo U.S. Pat. No. 4,155,237 issued May 22, 1979 also discloses a splining machine including a pair of slidable tooth forming racks and a hollow, toothed mandrel. The machine further includes a workpiece unloading member extending from the headstock spindle side of the machine through the hollow mandrel to engage a splined workpart, a slidable loading member on the tailstock side of the machine including a workpart clamp to hold the workpart on the end of the mandrel during splining and rotatable with the mandrel for this purpose, a rotatable indexer mechanism with U-shaped workpart retainers to feed individual parts between the loader and mandrel, and a guide tube between the loader and mandrel for guiding workpiece movement toward and away from the mandrel.

A splining machine is also described in the Hooker U.S. Pat. No. 1,510,889 issued Oct. 7, 1924. In this patent, a cup-shaped sheet metal blank is mounted on a rotatable toothed mandrel with the mandrel received in the open sleeve of the blank and the end wall of the blank engaged against the end of the mandrel by a threaded nut. A hob or rack with gear teeth thereon is mounted such that it can be reciprocated and rotated relative to the mandrel synchronously therewith to intermesh the teeth of the mandrel and hob with the sleeve of the blank therebetween.

And, the Lindell U.S. Pat. No. 3,473,211 issued Oct. 21, 1969 illustrates a machine for rolling internal teeth in the sleeve of a cup-shaped sheet metal power transmission member while the sleeve is supported and clamped on a stationary toothed mandrel. A set of revolving rollers engages the exterior surface of the sleeve to roll the sleeve into the mandrel teeth to form gear type teeth. Also see the McCardell U.S. Pat. No. 3,062,077 issued Nov. 6, 1967 for the pressure forming of internal teeth on a workpart.

The corrugation of tubular or cup-shaped blanks to simultaneously form internal and external tooth-like profiles by a rolling process employing a rotatably mounted toothed mandrel and a pair of rotating dies is known as shown, for example, in the Mason U.S. Pat. No. 76,220 issued Mar. 31, 1868, the Greis et al. U.S. Pat. No. 3,407,638 issued Oct. 29, 1968, the Kiplinger U.S. Pat. No. 3,630,058 issued Dec. 28, 1971 and the Anderson U.S. Pat. No. 4,045,988 issued Sept. 6, 1977.

However, to-date prior art workers have had difficulty using the types of machines and methods described hereinabove in manufacturing a splined cup-shaped power transmission member, such as a clutch hub, within the well known six or eight sigma tolerance which includes total part print tolerances. In particular, prior art workers have had difficulty with respect to the axially extending splines or teeth on the sleeve portion and especially in meeting the specific tolerance limiting taper of the splines along the longitudinal axis of the sleeve prescribed by users of the parts, such as automobile manufacturers. This problem has frequently been referred to as "bellmouthing" of the sleeve characterized by an outward tapering of the splined sleeve in a longitudinal or axial direction from the annular end wall toward the open end of the sleeve. A typical tolerance for "bellmouthing" has been set as 0.016 inch for a particular clutch hub for power transmissions. Furthermore, it has been difficult to provide the desired longitudinal tooth tolerance (bellmouth tolerance) and at the same time maintain the proper roundness tolerance for the cylindrical oil seal surface or sleeve of the clutch hub. A typical tolerance for oil seal surface roundness has been set as 0.006 inch for the clutch hub just mentioned. The oil seal surface is typically connected to the sleeve portion of the power transmission member by a so-called transition region which heretofor has not been splined or otherwise substantially deformed in the splining process since past experience indicated that splining of the transition region could increase out of roundness of the oil seal surface.

Clutch hubs of the type of interest are described in the aforementioned Killop U.S. Pat. No. 3,982,415.

SUMMARY OF THE INVENTION

It is an object of the present invention to provide an improved method and machine for forming generally axially-extending splines or teeth on the sleeve of a cup-shaped power transmission member such as a clutch hub, using intermeshing toothed racks and a rotatable toothed mandrel and yet satisfy the sigma tolerance prescribed for the part, especially the close bellmouth tolerance for the splines or teeth.

It is another object of the invention to provide such an improved method and machine which can provide the axially-extending splines or teeth with bellmouth within close tolerance and also which can maintain the cylindrical oil seal surface or sleeve within close roundness tolerance.

It is another object of the invention to provide such a method in which the sleeve of the power transmission member is positioned on the mandrel such that an annulus or ring-shaped lip portion of the sleeve adjacent the open end thereof is not intermeshed between the rack teeth and mandrel teeth and thus is not splined, preferably not even deformed, and is of sufficient length to substantially reduce bellmouth and maintain spline taper within close tolerances.

It is still another object of the invention to provide a power transmission member, such as a clutch hub, having a sleeve with pressure formed axially-extending splines or teeth intersecting with an unsplined annulus or ring-shaped lip portion adjacent the open end of the sleeve such that the unsplined ring-shaped portion reduces the bellmouth to within close tolerance limits while also having the transition area provided with pressure formed splines or teeth.

It is yet another object of the invention to provide a clutch hub and the like wherein the hub including the splined sleeve and oil seal surface is within required sigma tolerance, especially wherein the bellmouth of the splines or teeth on the sleeve is within about 0.010 inch, preferably within about 0.005 inch, and wherein the roundness of the cylindrical oil seal surface is within about 0.005 inch, despite having the transition region splined.

The present invention contemplates intermeshing of a portion of the axial length of the sleeve between the mandrel teeth and rack teeth while leaving a ring-shaped lip portion of the sleeve adjacent the open end thereof positioned outside the region of the mandrel teeth and rack teeth such that the ring-shaped portion is not splined and such that the unsplined portion reduces bellmouth of the splined portion.

In accordance with a typical embodiment of the invention, the rotatable toothed mandrel and pair of toothed racks are offset from their normal positions such that when the open sleeve of a clutch hub blank is positioned on the mandrel, a ring or annulus-shaped lip portion of the sleeve adjacent its open end and of selected length is not intermeshed between the mandrel teeth and rack teeth and thus is not pressure formed with splines during the actual splining operation. Preferably, the ring-shaped lip portion is not deformed at all in the splining operation. Furthermore, the so-called transition area between the cylindrical oil seal surface and sleeve is preferably pressure formed with splines or teeth in this offset arrangement. Applicant has found that this offset arrangement unexpectedly substantially reduces bellmouth and maintains oil seal surface roundness, producing a clutch hub having longitudinal splines or teeth on the sleeve with bellmouth within close tolerance, e.g. within about 0.010 inch, preferably within about 0.005 inch, and having an oil seal surface with roundness within close tolerance, e.g. about 0.005 inch, which tolerances are well within those specified by users of these parts.

DESCRIPTION OF PREFERRED EMBODIMENTS

Figure 1:
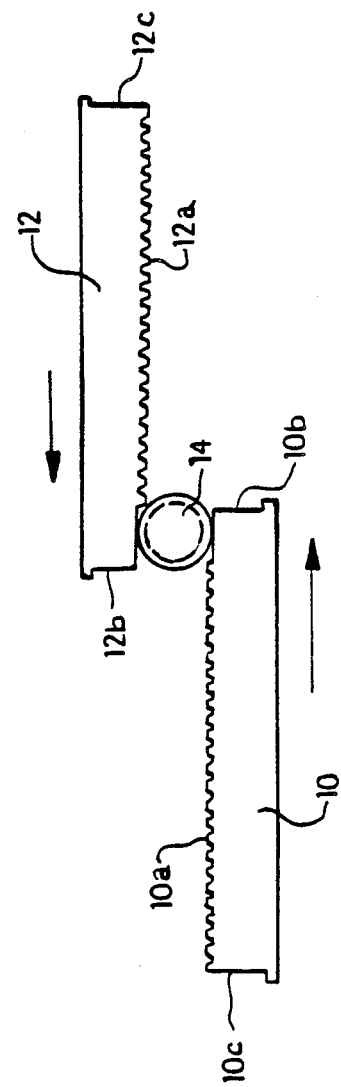
FIG. 1 is a side elevational view in schematic form showing a pair of slidable racks with a mandrel located therebetween.
Figure 2:
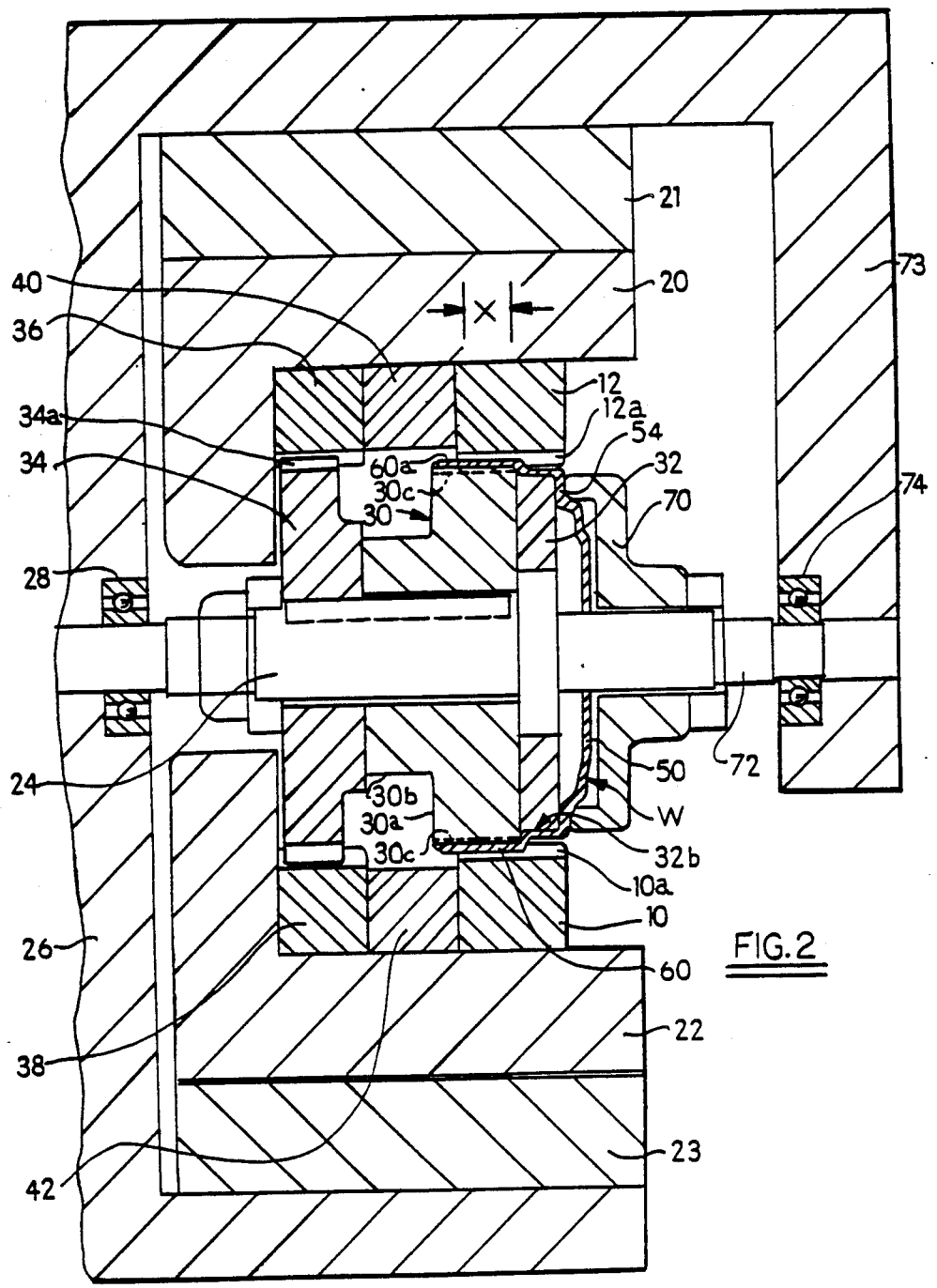
FIG. 2 is a partial sectional view showing a clutch hub blank mounted on the mandrel between the racks with the mandrel and racks being offset axially relative to one another.

FIG. 1 illustrates in a schematic form a machine having a pair of rectilinearly-shaped spline or tooth-forming racks 10, 12 and a toothed mandrel 14 supported therebetween. As is well known, the elongated racks 10, 12 are mounted in the machine for sliding motion in opposite directions past opposite sides of the mandrel 14. The racks include transversely-extending teeth 10a, 12a usually shaped in a pre-selected pattern proceeding from the leading end 10b, 12b to the trailing end 10c, 12c of each rack. A preferred rack configuration is described in pending U.S. patent application Ser. No. 347,747, now U.S. Pat. No. 4,485,657 filed Feb. 10, 1982 in the names of Paul Fitzpatrick and Robert R. Ridley and of common assignee herewith, the teachings of which are incorporated herein by reference. FIG. 2 shows the racks 10, 12 mounted on upper and lower L-shaped tool holder plates 20, 22 which, in turn, are carried on upper and lower slide members 21, 23 as is well known in the art. The tooth-forming racks 10, 12 are driven in sliding motion by a suitable drive mechanism, e.g., a hydraulic piston and cylinder system as is also known in the art, e.g., as shown in the McCardell U.S Pat. Nos. 3,015,243 and 3,214,951 of common assignee herewith and the teachings of which are incorporated herein by reference. The piston and cylinder assemblies are substantially identical in size and are interconnected to a common source of fluid pressure (not shown) with a control valve interposed between the hydraulic assemblies and the common fluid pressure source to simultaneously control both assemblies. The hydraulic assemblies bias the racks 10, 12 concurrently at the same velocity in opposite directions due to the interlocking effect of the hydraulic pressure on the assemblies.

The machine also includes a headstock spindle 24 rotatably supported in the rigid machine frame 26 by anti-friction bearings 28 as is well known, only one set of which is shown in FIG. 2. The spindle 24 extends in cantilever fashion past the machine frame 26 to between the vertically opposed racks 10, 12.

Keyed on the cantilevered end of the spindle 24 is a mandrel 30 having a large diameter, externally-toothed portion 30a and a smaller diameter portion 30b. The mandrel portion 30a includes external, radially-extending teeth 30c adapted to mesh with the teeth 10a, 12a of the racks. The mandrel teeth 30c typically are fully conjugate to the spline or tooth form to be formed in the clutch hub blank W while the teeth of the racks typically include one section of fully conjugate teeth and also other sections of teeth which vary from the conjugate shape in preselected manner to facilitate deformation of the blank W, as is described in the aforementioned pending U.S. patent application Ser. No. 347,747, already incorporated herein by reference.

Fastened by suitable means, such as screws and the like, to the mandrel is an annular adapter plate 32 for purposes to be described.

Also keyed on the spindle 24 is a timing gear 34 having teeth 34a adapted to mesh with timing racks 36, 38 bolted or otherwise attached to the tool holder plates 20, 22, respectively. The function of the timing gear 34 and timing racks 36, 38 is to insure that rotation of mandrel 24 is coordinated and synchronized with the sliding movement of the racks 10, 12 which must mesh therewith. In particular, the timing gear 34 and racks 36, 38 insure proper meshing between the mandrel and rack teeth.

As is apparent in FIG. 2, spacer members 40, 42 are located between the timing racks 36, 38 and the adjacent tooth racks 10, 12 on the tooling holder plates 20, 22. These spacer members 40, 42 are attached or otherwise held on the plates and may be of different size to vary the axial position of the toothed racks 10, 12 relative to the axial position of the toothed mandrel 30 for purposes to be explained below.

Figure 3:
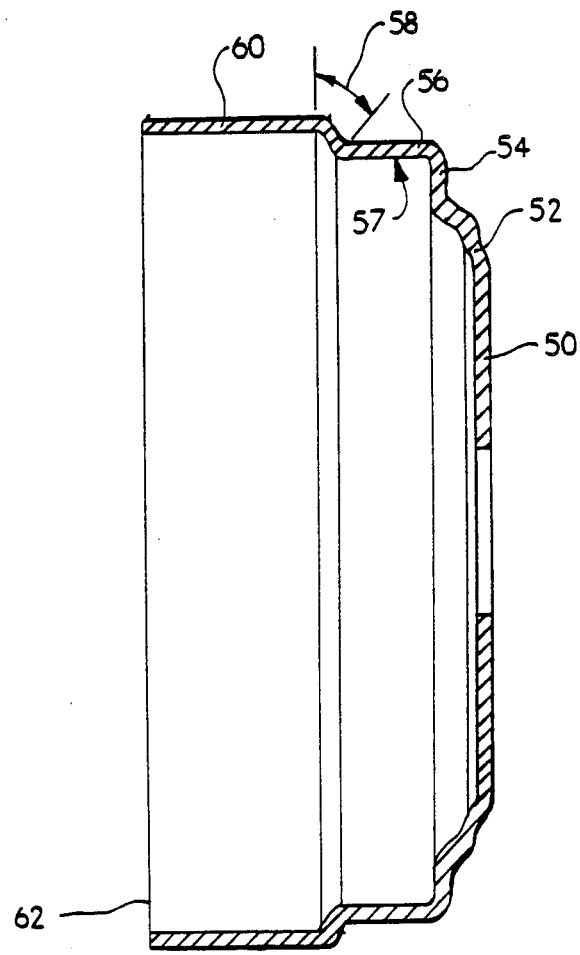
FIG. 3 is a cross-sectional view of a clutch hub blank.
Figure 4:
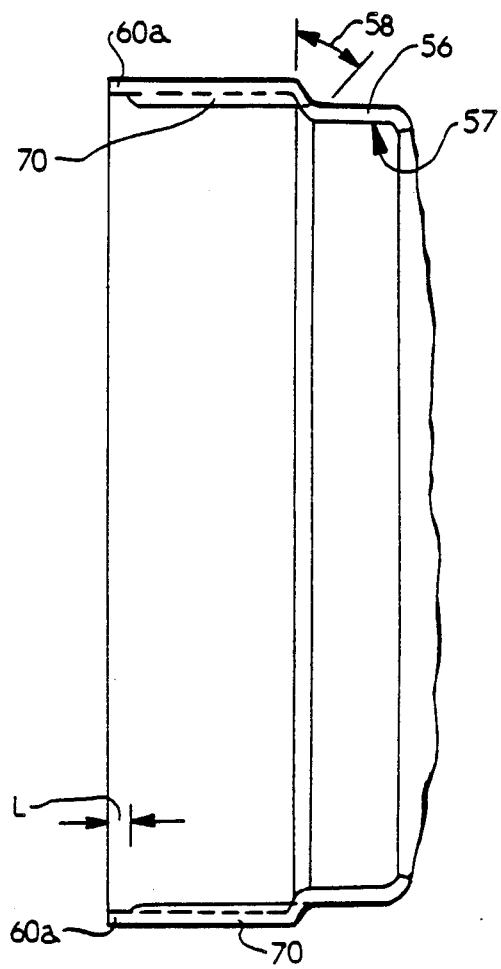
FIG. 4 is a partial cross-sectional view of the splined clutch hub.

The clutch hub blank W is shown in FIGS. 2 and 3. The clutch hub blank includes an annular end wall 50 connected by annular shoulders 52 and 54 to a cylindrical oil sealing surface or sleeve 56 defining a piston or O-ring receiving bore 57 which must be maintained within a preselected roundness tolerance after splining of sleeve 60. The roundness of the oil sealing surface or sleeve 56 on the clutch hub blank typically is less than 0.004 inch, usually less than 0.002 inch prior to splining. The oil sealing surface 56 is in turn connected by a transition region 58 of curvilinear profile, particularly generally truncated conical in shape, to a cylindrical sleeve 60 having an open end 62. The sleeve 60 of the clutch hub will be pressure formed between the mandrel teeth 30c and rack teeth 10a, 12a to form axially-extending splines or teeth 70, FIG. 4. For one clutch hub application, the splined hub must satisfy the six or eight sigma tolerance and in particular the splines or teeth 70 must not taper outwardly along the length of the sleeve 60 toward the open end 62, i.e., bellmouth, more than 0.016 inch, FIG. 4. At the same time the oil seal surface or sleeve 56 must be maintained within a roundness tolerance of 0.006 inch.

According to the invention, a clutch hub can be produced within six and preferably eight sigma tolerance. In particular, spline bellmouth within about 0.010 inch, preferably within about 0.005 inch, and oil seal surface roundness within about 0.005 inch, are obtainable, these values being within the required specific tolerances. To achieve these tolerances in the final splined clutch hub P, the clutch hub blank W is mounted on the mandrel 30 which is offset axially relative to the toothed racks 10, 12 by a distance X as viewed in FIG. 2. The axial offset is measured from the centerline of racks 10, 12 to the centerline of the large diameter portion 30a of the mandrel as viewed in FIG. 2. It is apparent that the annular shoulder 54 is engaged against the adapter plate 32 by a member 70 mounted on a freely rotating tailstock spindle 72. The spindle 72 is rotatably supported in the machine frame extension 73 by anti-friction bearings 74 (only one set shown) as is well known and illustrated in the aforementioned McCardell U.S. patents.

In FIG. 2, the cylindrical oil seal surface or sleeve 56 fits over the cylindrical surface 32b of the adapter plate with a slight internal clearance of 0.001–0.002 inch therebetween while the sleeve 60 fits over the mandrel 30 as shown with a slight internal clearance of 0.001–0.002 inch therebetween. As a result of the relative axial offset X between the racks 10, 12 and mandrel 30, the sleeve 60 extends past the racks 10, 12 toward the headstock side of the machine and is unsupported by the racks. This arrangement provides an annular or ring-shaped lip portion 60a of the sleeve adjacent the open sleeve end 62 which is not positioned between the mandrel 24 and racks 10, 12 and thus is not pressure formed or splined with the remaining portion of the sleeve 60. Also with this arrangement, the transition region 58 between the sleeve 60 and oil seal surface 56 is pressure-formed between the mandrel teeth 30c and rack teeth 10a, 12a in a tooth or spline-like shape, see FIG. 5.

Figure 6:
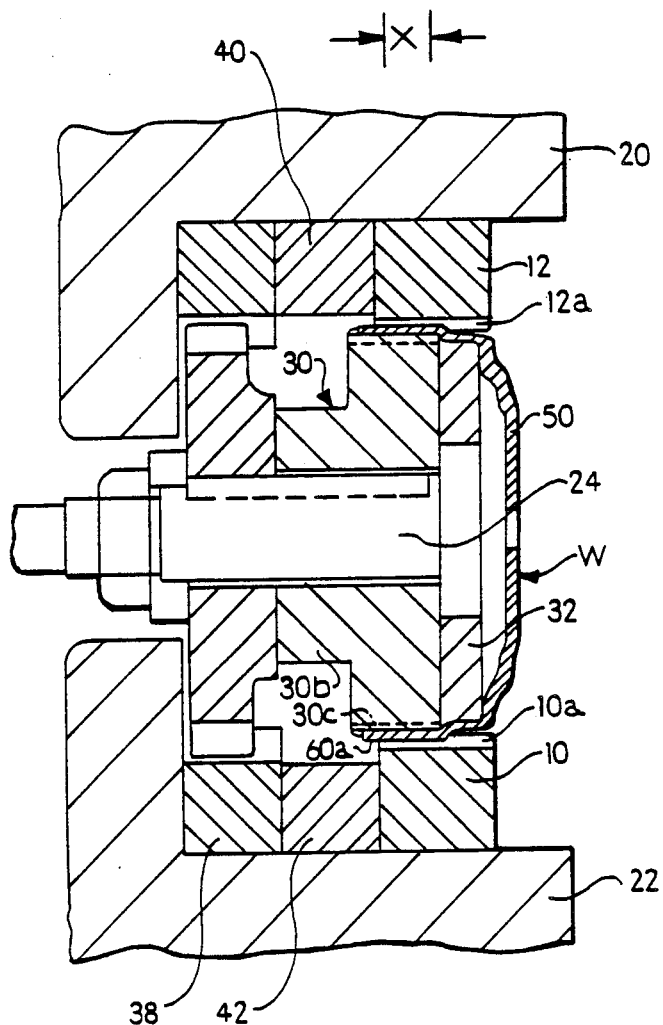
FIG. 6 is similar to FIG. 2 showing a machine with certain tailstock components deleted.

It is apparent that the relative axial offset between the mandrel 30 and racks 10, 12 can be provided by moving either the mandrel or racks or both relative to one another. The use of spacer members 40, 42 provides a convenient means for varying the axial offset. It may be possible with the present invention to dispense with the member 70 and tailstock spindle 72, FIG. 6. In particular, the ring-shaped lip portion 60a of sleeve 60 has been found to impart a self-locating effect to the blank W as it is splined to maintain the blank in substantially fixed position on the mandrel without the need for external clamping means.

During the actual rolling operation, the toothed racks 10, 12 are activated to slide in opposite directions past the mandrel 30 with the rack teeth 10a, 12a contacting the sleeve 60, except for annulus or lip 60a, and the transition region 58 and inter-meshing with the mandrel teeth 30c to pressure form the spline or tooth profile or shape therein. During deformation, the annulus on ring-shaped portion 60a is not pressure formed and the splines on the remainder of the sleeve terminate short of the open sleeve end 62 at the ring-shaped lip portion 60a as shown. The annulus or ring-shaped portion 60a has been found to unexpectedly and substantially reduce bellmouth and to allow formation of the tooth or spline shape in the sleeve 60 within a close bellmouth tolerance of 0.010 inch, preferably within a bellmouth tolerance of 0.005 inch. It appears that the ring-shaped lip portion 60a functions to restrain expansion of the open sleeve end 62 during splining to substantially reduce bellmouth within the required tolerance, although Applicant does not intend to be bound by this theory. The length, L, of the ring-shaped lip portion 60a in the axial direction is selected to be sufficient to exert the necessary restraining force against expansion of the open sleeve end during splining and to that end preferably is at least about 15% of the total length of the sleeve 60. Pressure-forming of tooth or spline-like shapes in the transition region 58 allows the undeformed annulus or ring-shaped lip portion 60a to be provided at the sleeve open end 62 and yet provide a tooth or spline axial length which is sufficient for the intended purpose as a clutch hub. Furthermore, pressure-forming in this manner can be effected and yet provide the cylindrical oil seal surface 56 within its close roundness tolerance of 0.005 inch, despite the splining of the transition region 58 situated closely thereto. This was unexpected since prior experience indicated that oil seal roundness would be increased by splining the transition region 58. Annular end wall 50 and shoulders 52 and 54 likewise are maintained within required tolerances.

Figure 5:
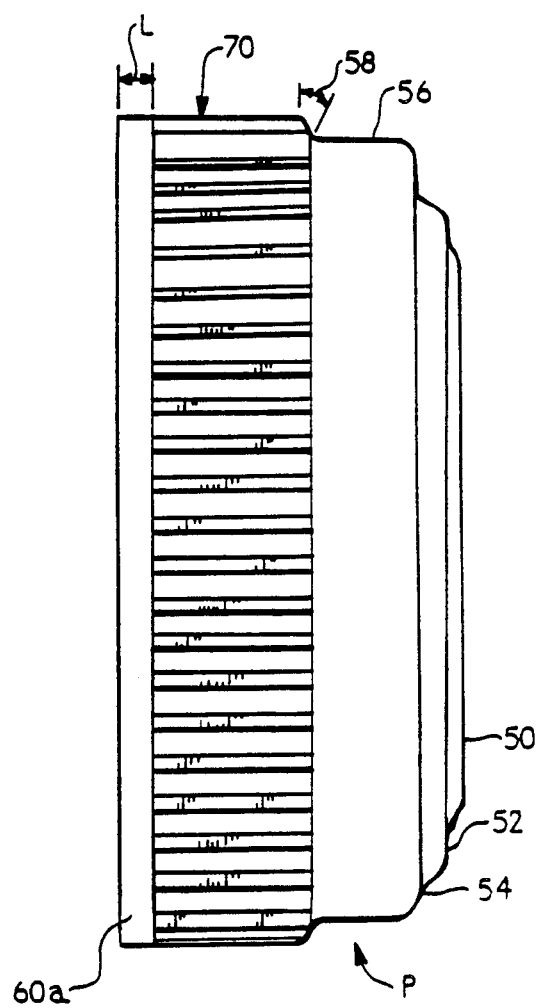
FIG. 5 is an elevational view of the splined clutch hub showing the splined sleeve, oil seal surface and transition region therebetween.

The pressure formed clutch hub P shown in FIG. 5 thus is characterized as having a splined sleeve and cylindrical oil sealing sleeve and being within six sigma tolerance, preferably within eight sigma tolerance wherein bellmouth of the longitudinal splines or teeth 80 is within a close tolerance of about 0.010 inch, preferably about 0.005 inch, and wherein roundness of the oil seal surface or sleeve 56 is within a close tolerance of about 0.005 inch. It is further characterized as having the unsplined ring-shaped lip portion 60a adjacent the open sleeve end 62 of sufficient axial length to substantially reduce bellmouth to within these aforementioned tolerances and having the transition region splined contiguously and concurrently with the splines on the sleeve 60.

Figure 7:
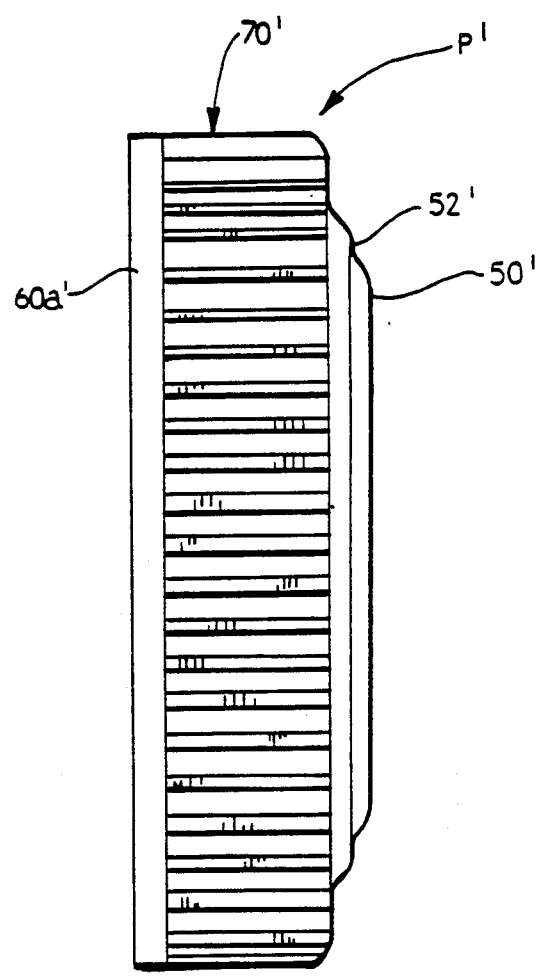
FIG. 7 is an elevational view of another splined clutch hub showing the splined sleeve and annular end wall.

Those skilled in the art will appreciate that a splined clutch hub P' of the type shown in FIG. 7 can be made by the invention. In FIG. 7, like numerals primed represent like features. For example, clutch hub P' includes an annular end wall 50' connected by shoulders 52', 54' to splined sleeve 60' having an unsplined lip portion 60a' adjacent the open end 62' to substantially reduce bellmouth of the splined sleeve. As is apparent in FIG. 7, clutch hub P' does not include an oil sealing sleeve.

As used herein and in the appended claims, the term spline(s) is intended to include splines, tooth elements or tooth forms as well as similar features provided on power transmission members.

While certain preferred embodiments of the method and apparatus of the invention have been described in detail herein, those familiar with this art will recognize that various modifications and changes can be made therein for practicing the present invention as defined by the following claims.

I claim:

1. A power transmission member comprising a radially-extending end wall and a cylindrical axially-extending sleeve connected to the end wall and terminating remote from the end wall in an open end, said sleeve having pressure formed internal and external axially-extending splines formed therein by intermeshing of teeth of a mandrel on which the sleeve is mounted and teeth of a pair of racks slidable therepast, said splines terminating short of the open sleeve end in an unsplined cylindrical ring-shaped lip portion which reduces bellmouth of the splines to within about 0.010 inch along their length.

2. The power transmission member of claim 1 wherein the ring-shaped portion is not deformed during formation of the splines on the remainder of the sleeve by intermeshing of the mandrel teeth and rack teeth.

3. The power transmission member of claim 1 wherein the bellmouth of the splines on the sleeve is within about 0.005 inch.

4. The power transmission member of claim 1 wherein the axial length of the ring-shaped portion is at least 15% of the total length of the sleeve.

5. The power transmission member of claim 1 which is a clutch hub for use in a transmission.

6. The power transmission member of claim 1 which includes a curvilinear transition region between the splined sleeve and annular end wall and said transition region includes splines contiguous with the splines of the splined sleeve and formed at the same time therewith by intermeshing of the mandrel teeth and rack teeth.

7. A power transmission member comprising a radially-extending end wall, a first cylindrical axially-extending sealing sleeve connected to the end wall and a second cylindrical axially-extending sleeve connected to the sealing sleeve and terminating remote from the sealing sleeve in an open end, said second sleeve having pressure formed internal and external axially-extending splines formed therein by intermeshing of teeth of a mandrel on which the second sleeve is mounted and teeth of a pair of racks slidable therepast, said splines terminating short of the open sleeve end in an unsplined cylindrical ring-shaped lip portion which maintains bellmouth of the splines to within about 0.010 inch along their length.

8. The power transmission member of claim 7 wherein the ring-shaped portion is not deformed during formation of the splines on the remainder of the second sleeve by intermeshing of the mandrel teeth and rack teeth.

9. The power transmission member of claim 7 wherein the power transmission member includes a curvilinear transition region between the splined sleeve and sealing sleeve and said transition region includes splines contiguous with the splines of the splined sleeve and formed at the same time therewith by intermeshing of the mandrel teeth and rack teeth.

10. The power transmission member of claim 7 wherein the bellmouth of the splines on the second sleeve is within about 0.010 inch and the roundness of the sealing sleeve is within about 0.005 inch.

11. The power transmission member of claim 7 wherein the bellmouth of the splines on the second sleeve is within about 0.005 inch and the roundness of the sealing sleeve is within about 0.005 inch.

12. The power transmission member of claim 7 wherein the axial length of the ring-shaped portion is at least 15% of the total length of the second sleeve.

13. The power transmission member of claim 7 which is a clutch hub for use in a transmission.

* * * * *